US 8,274,672 B2

(12) United States Patent
Miyata

(10) Patent No.: US 8,274,672 B2
(45) Date of Patent: Sep. 25, 2012

(54) PRINTING SYSTEM AND PRINTER DRIVER

(75) Inventor: Yuji Miyata, Kitanagoya (JP)

(73) Assignee: Brother Kogyo Kabushiki Kaisha, Nagoya-shi, Aichi (JP)

( * ) Notice: Subject to any disclaimer, the term of this patent is extended or adjusted under 35 U.S.C. 154(b) by 802 days.

(21) Appl. No.: 12/397,378

(22) Filed: Mar. 4, 2009

(65) Prior Publication Data

US 2009/0268236 A1    Oct. 29, 2009

(30) Foreign Application Priority Data

Apr. 28, 2008    (JP) .................................. 2008-117594

(51) Int. Cl.
    *G06F 3/12*    (2006.01)
(52) U.S. Cl. ..................................... 358/1.13; 358/1.15
(58) Field of Classification Search .................. None
    See application file for complete search history.

(56) References Cited

U.S. PATENT DOCUMENTS

| | | | | |
|---|---|---|---|---|
| 6,433,882 | B1* | 8/2002 | Mori et al. | 358/1.13 |
| 6,731,898 | B1* | 5/2004 | Landa et al. | 399/298 |
| 6,829,060 | B2* | 12/2004 | Simpson et al. | 358/1.15 |
| 7,443,521 | B2 | 10/2008 | Saito et al. | |
| 2003/0007818 | A1* | 1/2003 | Kato | 400/61 |
| 2003/0026619 | A1* | 2/2003 | Miyoshi et al. | 399/19 |
| 2003/0053114 | A1* | 3/2003 | Hopper | 358/1.15 |
| 2005/0099645 | A1 | 5/2005 | Saito et al. | |
| 2005/0179926 | A1* | 8/2005 | Nishikawa et al. | 358/1.13 |
| 2007/0002350 | A1* | 1/2007 | Tyrell | 358/1.13 |
| 2007/0070374 | A1* | 3/2007 | Boyes et al. | 358/1.13 |
| 2007/0172270 | A1* | 7/2007 | Jorgens et al. | 399/320 |
| 2007/0177176 | A1* | 8/2007 | Morooka | 358/1.13 |
| 2007/0280719 | A1* | 12/2007 | Taguchi | 399/83 |
| 2008/0316524 | A1* | 12/2008 | Lefebvre et al. | 358/1.15 |
| 2009/0122341 | A1* | 5/2009 | Natori | 358/1.15 |

FOREIGN PATENT DOCUMENTS

| | | |
|---|---|---|
| JP | 10-222328 | 8/1998 |
| JP | 2000-112685 | 4/2000 |
| JP | 2005-063113 | 3/2005 |
| JP | 2005-174121 | 6/2005 |
| JP | 2007-133675 | 5/2007 |
| JP | 2007-142638 | 6/2007 |

* cited by examiner

*Primary Examiner* — Satwant Singh
(74) *Attorney, Agent, or Firm* — Banner & Witcoff, Ltd.

(57) ABSTRACT

In a printing system, in response to a request for duplex printing of print object data, the control portion of an information processing apparatus executes a first printing process according to a first printer driver, to generate first printing data and print information based on the print object data. The first printing data is used by a first printing apparatus for printing on the first surface of a recording medium. The control portion further executes a second printing process according to a second printer driver, to generate second printing data based on the print information. The second printing data is used by a second printing apparatus for printing on the second surface of the recording medium.

14 Claims, 12 Drawing Sheets

FIG.12

| Obverse-side printed sheets are stacked: | Reverse page is: | | | |
|---|---|---|---|---|
| | To be printed on upper surface of: | | To be printed on lower surface of: | |
| | Top sheet (by 1st type printer) | Bottom sheet (by 2nd type printer) | Top sheet (by 3rd type printer) | Bottom sheet (by 4th type printer) |
| Face up (or In descending order) | In ascending order | In descending order | In descending order | In ascending order |
| Face down (or In ascending order) | In descending order | In ascending order | In ascending order | In descending order |

PRINTING SYSTEM AND PRINTER DRIVER

CROSS REFERENCE TO RELATED APPLICATION

The present application claims priority from Japanese Patent Application No. 2008-117594 filed on Apr. 28, 2008. The entire content of this priority application is incorporated herein by reference.

TECHNICAL FIELD

The present disclosure relates to a printing system and a printer driver.

BACKGROUND

A printing apparatus, such as a simple printer or a multifunction printer, having a duplex printing function is conventionally known. A user can request the printing apparatus to print an image, while setting various printing conditions on the computer, for example. In response to the request, a printer driver generates printing data according to the specified printing condition. The generated printing data is provided for the printing apparatus, so that printing is performed. The printing conditions, which can be set by a user, include Color/Monochrome (Number of Colors), Resolution, Scaling and the like, for example. In the case of duplex printing, the printing on the obverse and reverse sides of a recording medium is typically performed on the same printing conditions.

However, a user sometimes plans to perform printing on the obverse side of a recording medium and printing on the reverse side of the recording medium, separately by using different printers. For example, an address is printed on the obverse side of a post card by a monochrome laser printer, and a color photograph is printed on the reverse side of the post card by a color inkjet printer.

In this case, according to the conventional construction, the user should request printing on the obverse side and printing on the reverse side, individually and separately. That is, the printing conditions should be set separately for the obverse-side printing and the reverse-side printing. Thus, there is a need in the art to improve convenience of duplex printing for a user.

SUMMARY

A printing system according to an aspect of the present invention includes a first printing apparatus, a second printing apparatus and an information processing apparatus capable of being connected to the first printing apparatus and the second printing apparatus. The information processing apparatus includes a control portion configured to execute a duplex printing process to enable printing on a first surface and a second surface of a recording medium in response to a request for duplex printing of print object data. The control portion executes a first printing process according to a first printer driver, during the duplex printing process, to generate, based on the print object data, first printing data to be used by the first printing apparatus for printing on the first surface and print information to be used for printing on the second surface. The control portion further executes a second printing process according to a second printer driver, during the duplex printing process, to generate, based on the print information, second printing data to be used by the second printing apparatus for printing on the second surface.

According to another aspect of the present invention, a printing method for use in a printing system is provided. The printing system includes a first printing apparatus, a second printing apparatus and an information processing apparatus capable of being connected to the first printing apparatus and the second printing apparatus. The information processing apparatus includes a control portion configured to execute a duplex printing process to enable printing on a first surface and a second surface of a recording medium in response to a request for duplex printing of print object data. The printing method includes executing a first printing process according to a first printer driver during the duplex printing process, to generate, based on the print object data, first printing data to be used by the first printing apparatus for printing on the first surface and print information to be used for printing on the second surface. The printing method further includes executing a second printing process according to a second printer driver during the duplex printing process, to generate, based on the print information, second printing data to be used by the second printing apparatus for printing on the second surface.

A printer driver system according to another aspect of the present invention includes an information processing apparatus capable of being connected to a first printing apparatus and a second printing apparatus. The information processing apparatus is configured to generate first printing data and print information in response to a request for duplex printing of print object data. The first printing data is generated based on the print object data, so as to be used by the first printing apparatus for printing on a first surface of a recording medium. The print information is generated based on the print object data, so as to be capable of being used by a second printer driver system for generating second printing data to be used by the second printer apparatus for printing on a second surface of the recording medium.

According to further another aspect of the present invention, a computer program product including a printer driver program is provided. The printer driver program can be embodied on a computer-readable medium and is operable to implement a printer driving method in a printing system that includes a first printing apparatus, a second printing apparatus and an information processing apparatus capable of being connected to the first printing apparatus and the second printing apparatus. The information processing apparatus includes a control portion capable of executing the printer driver program for implementing the printer driving method. The printer driver program includes code for generating first printing data and print information in response to a request for duplex printing of print object data. The first printing data is generated based on the print object data, so as to be used by the first printing apparatus for printing on a first surface of a recording medium. The print information is generated based on the print object data, so as to be capable of being used by a second printer driver program executed for generating second printing data to be used by the second printer apparatus for printing on a second surface of the recording medium.

BRIEF DESCRIPTION OF THE DRAWINGS

Illustrative aspects in accordance with the invention will be described in detail with reference to the following drawings wherein:

FIG. 12 is an explanatory diagram for illustrating how to determine the printing order of pages during the reverse-side printing process.

DETAILED DESCRIPTION

An illustrative aspect of the present invention will be hereinafter explained with reference to FIGS. 1 to 12.

1. Electrical Configuration of Printing System

Figure 1:
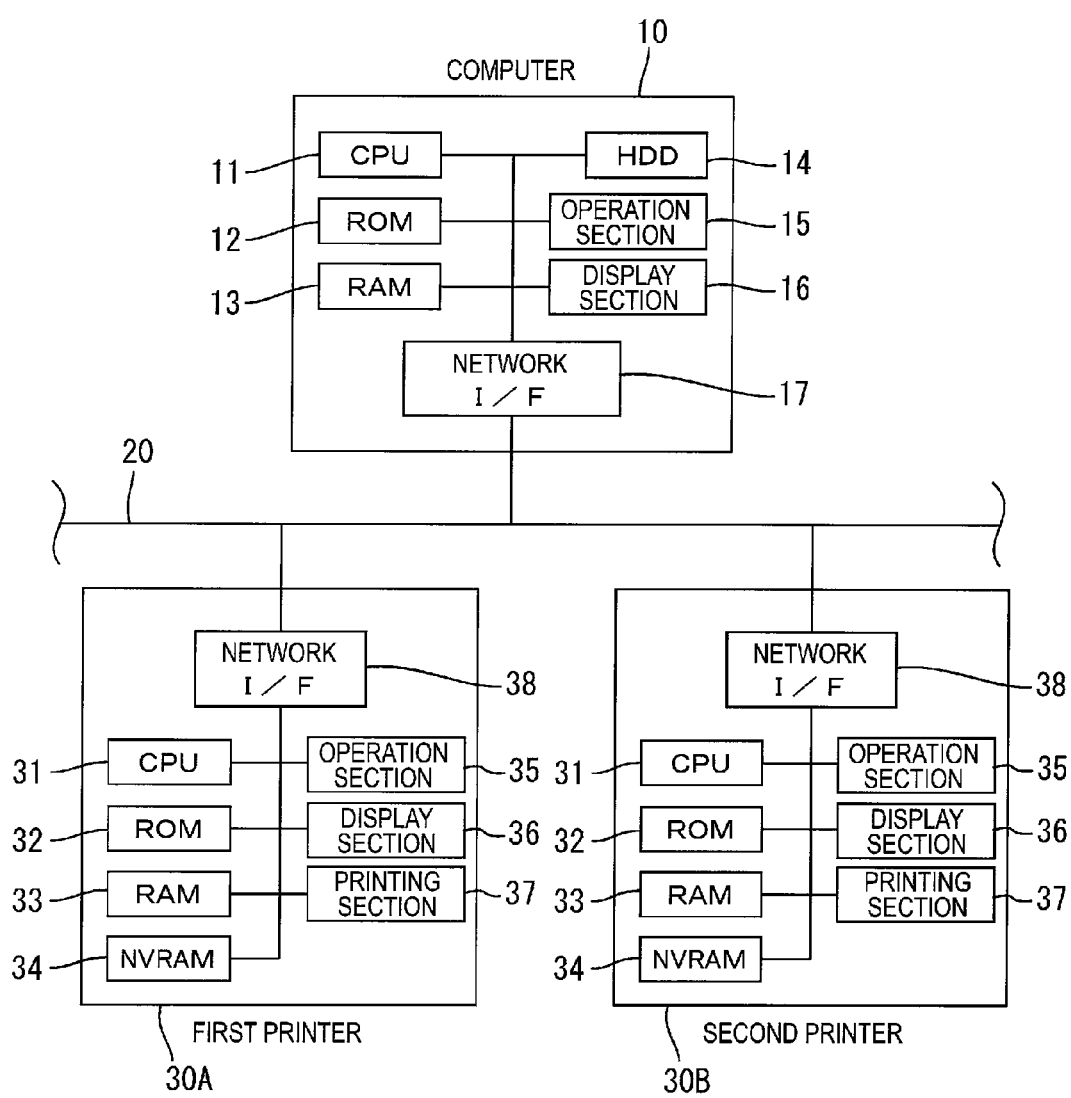
FIG. 1 is a block diagram showing the electrical configuration of a printing system.

FIG. 1 is a block diagram showing the electrical configuration of a printing system, which includes a computer 10 (i.e., an example of an information processing apparatus), a first printer 30A (i.e., an example of a first printing apparatus), and a second printer 30B (i.e., an example of a second printing apparatus).

The computer 10 includes a CPU 11 (i.e., an example of control portion), a ROM 12, a RAM 13, a hard disk drive 14, an operation section 15, a display section 16 (i.e., an example of a guide portion), a network interface 17 and the like.

The operation section 15 includes a keyboard, a pointing device and the like. The display section 16 includes a liquid-crystal display and the like. The network interface 17 can be connected to a communication line 20.

The hard disk drive 14 stores various programs, such as an OS, application software programs capable of generating print object data, a first printer driver (i.e., an example of a printer driver program) for controlling the first printer 30A and a second printer driver (i.e., an example of a second printer driver program) for controlling the second printer 30B.

Each of the first and second printers 30A, 30B includes a CPU 31, a ROM 32, a RAM 33, an NVRAM (nonvolatile memory) 34, an operation section 35, a display section 36, a printing section 37, a network interface 38 and the like.

Various programs are stored in the ROM 32. The CPU 31 controls the operations of various sections based on the programs retrieved from the ROM 32, while storing the processing results in the RAM 33 and/or the NVRAM 34.

The operation section 35 includes a plurality of buttons, which enable a user to perform various input operations, such as an operation for a print request. The display section 36 can include a liquid-crystal display and indicator lamps. Thereby, various setting screens, the operating condition and the like can be displayed.

The printing section 37 has a printing function, and thereby an image can be printed on at least one surface of a recording medium (not shown) such as paper. The network interface 38 can be connected to the external computer 10 or the like, via the communication line 20, in order to enable mutual data communication.

2. Printing Control Operation

Next, the operations for printing using the first and second printers 30A, 30B under control of the computer 10, will be explained with a central focus on duplex printing. In the present aspect, the duplex printing can be performed using different printers for obverse-side printing and reverse-side printing, as described in detail below.

Figure 2:
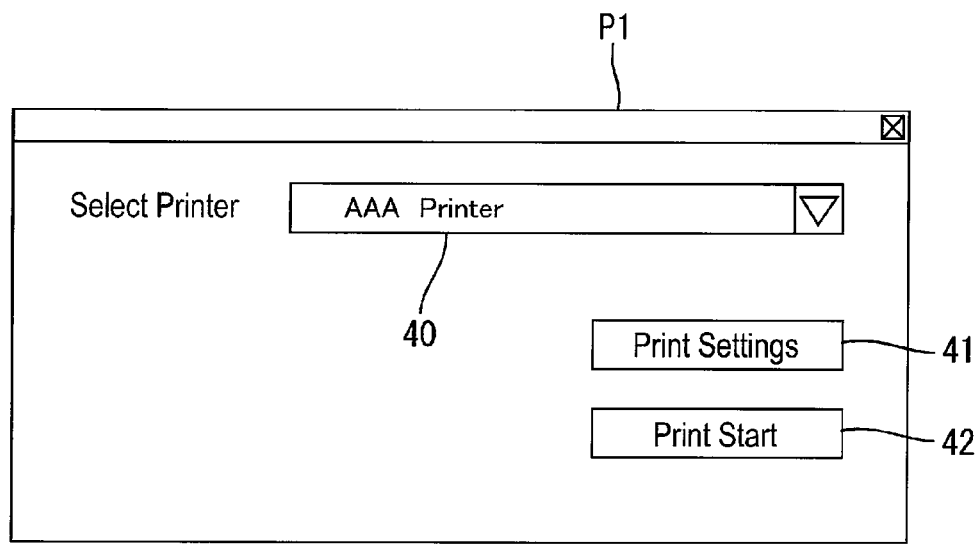
FIG. 2 is a diagram showing a print request screen.
Figure 3:
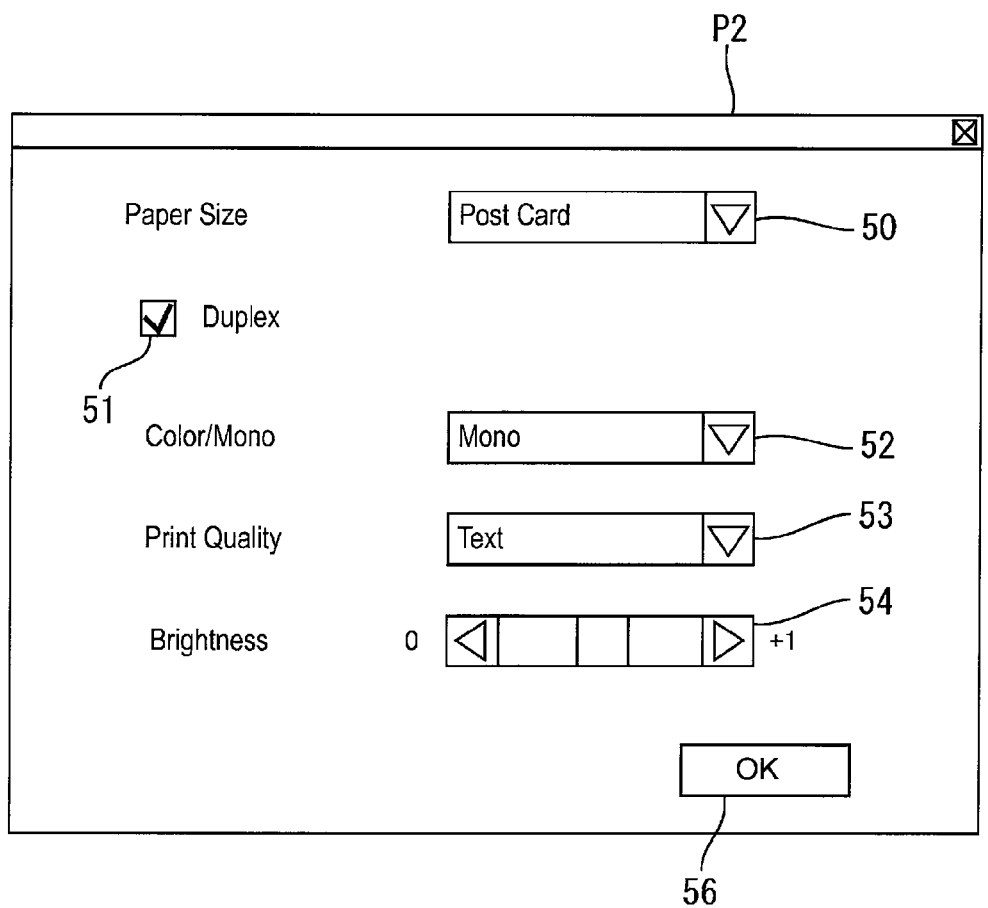
FIG. 3 is a diagram showing a first print setting screen.
Figure 4:
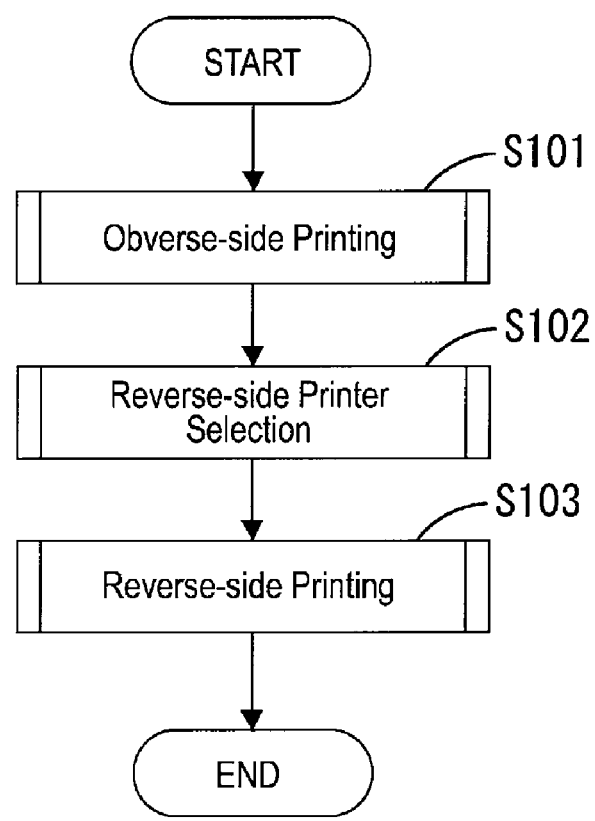
FIG. 4 is a flowchart of a duplex printing process.

FIG. 2 is a diagram showing a print request screen P1. FIG. 3 is a diagram showing a first print setting screen P2. FIG. 4 is a flowchart of a duplex printing process.

When a user inputs a print request on the operation section 15 via an application software program being executed for processing text and/or image data, the CPU 11 displays, on the display section 16, a print request screen P1 shown in FIG. 2, for example. The print request screen P1 includes a printer selection field 40, "Print Settings" button 41, "Print Start" button 42 and the like.

The list of printer names corresponding to printer drivers installed on the computer 10 can be displayed on the printer selection field 40. Thereby, the user can select a printer to be used for printing, from the available printers. In the case of duplex printing, according to the present aspect, the printer selected on the printer selection field 40 of the print request screen P1 is used for obverse-side printing, as described below.

When the user clicks "Print Settings" button 41 via the operation section 15, the CPU 11 activates the printer driver corresponding to the printer name selected on the printer selection field 40, and executes a process for setting printing conditions according to the printer driver.

Assume that the first printer 30A is selected on the printer selection field 40, in the present aspect. Then, the CPU 11 activates the first printer driver for the first printer 30A, and executes a first setting process according to the first printer driver, in order to set the first printing conditions on which the first printer 30A performs printing.

During the first setting process, the CPU 11 first displays, on the display section 16, a first print setting screen P2 shown in FIG. 3, for example.

The first print setting screen P2 includes fields enabling the user to select various setting options for the first printing conditions, such as "Paper Size" selection field 50, "Duplex Printing" selection field 51, "Color" selection field 52, "Print Quality" selection field 53 and "Brightness" setting field 54. The first print setting screen P2 further includes "OK" button 56.

In "Paper Size" selection field 50, the user can select the size of paper to be used for printing. In "Duplex Printing" selection field 51, the user can check or uncheck "Duplex Printing" option (i.e., the user can select Duplex Printing or Single-side Printing).

Further, Color/Monochrome (Number of Colors), Print Quality (Resolution) and Brightness (Color Adjustment) can be set for printing, in "Color" selection field 52, "Print Quality" selection field 53, and "Brightness" setting field 54, respectively.

The setting options for "Number of Copies", "Paper Orientation (Portrait or Landscape)", "Duplex Type or Binding Type (Upright Image or Inverted Image to be printed on the reverse side)", "Scaling", "Multiple Page", "Watermark", "Paper Tray (Feeder Tray and/or Catch Tray)", "Confidential Print (Secure Print)" and the like may be further provided, for example.

When the user clicks "OK" button 56 after setting the first printing conditions in the selection or setting fields 50 to 54 via the operation section 15, the CPU 11 stores, in the RAM 13, the values specified in the fields 50 to 54, as the set values of the first printing conditions. Then, the CPU 11 completes the first setting process while closing the first print setting screen P2 on the display section 16.

When the user thereafter clicks "Print Start" button 42 on the print request screen P1, the CPU 11 starts a printing process according to the printer driver (e.g., the first printer driver in the present aspect) selected on the printer selection field 40.

If "Single-side Printing" option is selected for the first printing conditions, the CPU 11 generates, according to the first printer driver, printing data based on print object data that is generated by an application software program being executed. The generated printing data includes the setting information on the first printing conditions, and is sent to the first printer 30A via the network interface 17.

The first printer 30A receives the printing data, and then performs single-side printing on one surface of paper according to the setting information included in the printing data. The operation for single-side printing can be performed in a conventional manner, and therefore the detailed explanation thereof is omitted.

If "Duplex Printing" option is selected for the first printing conditions (i.e., the user has requested Duplex Printing), the CPU 11 executes a duplex printing process shown in FIG. 4. During the duplex printing process, an obverse-side printing process (or first printing process) is first executed at step S101 according to the first printer driver, as follows.

(Obverse-Side Printing Process)

Figure 5:
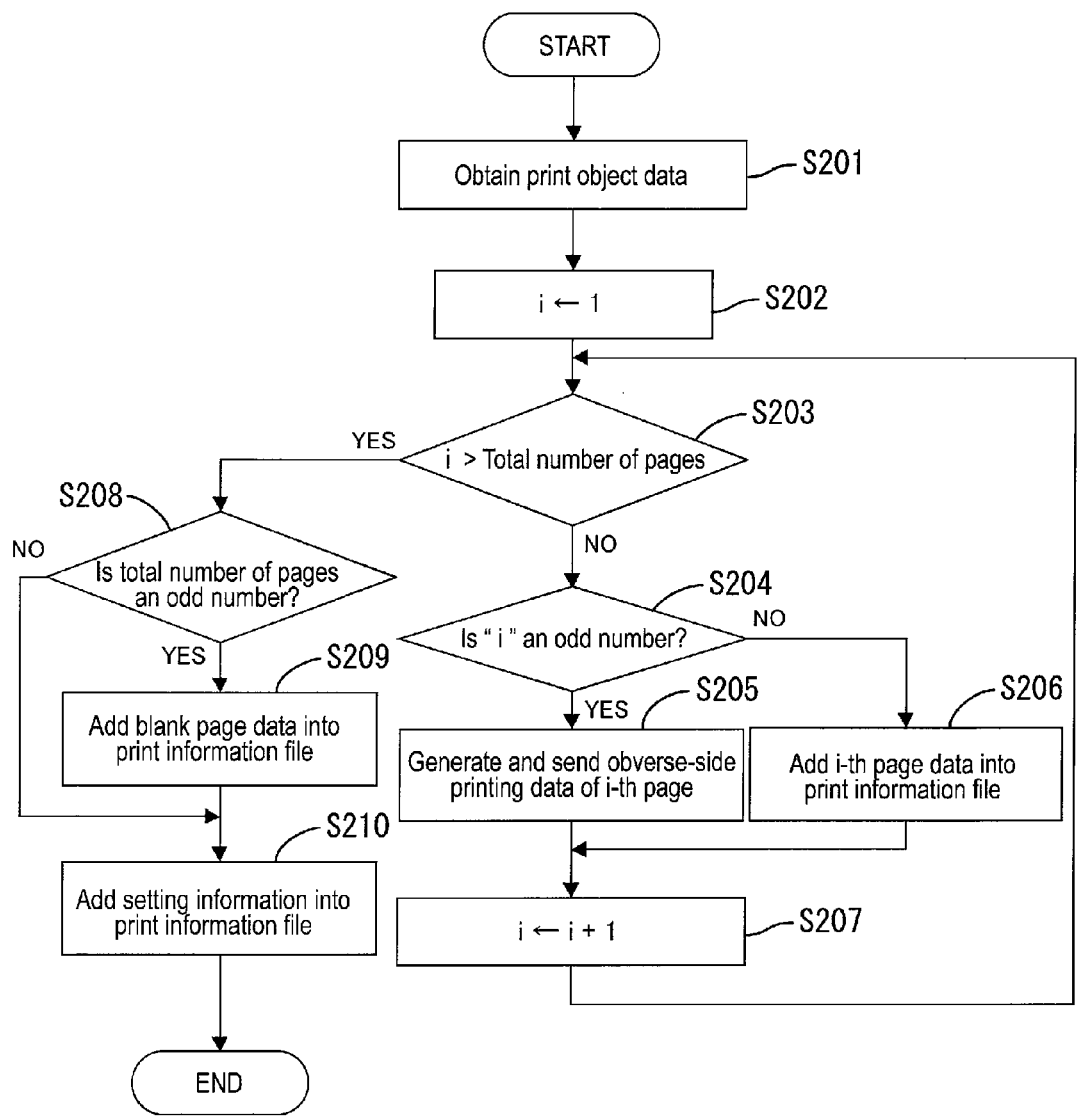
FIG. 5 is a flowchart of an obverse-side printing process.
Figure 6:
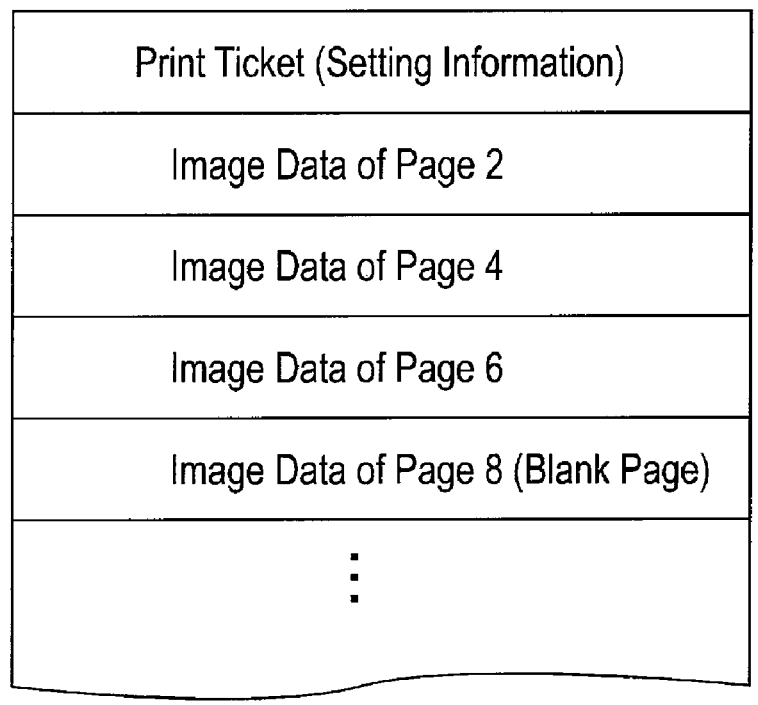
FIG. 6 is an illustrative diagram showing part of the content of a print information file.

FIG. 5 is a flowchart of the obverse-side printing process. FIG. 6 is an illustrative diagram showing part of the content of a print information file.

During the obverse-side printing process, the CPU 11 first receives print object data at step S201 from an application software program being executed. The print object data is in a file with EMF (Enhanced Meta File) format or XPS format described below, for example, which is provided as an intermediate file.

Next, the CPU 11 sets a parameter "i" to 1 at step S202. The parameter i represents the current page number that is in processing. At step S203, it is determined whether the current page number i exceeds the total number of pages to be printed by the present duplex printing process. The current page number i is 1, and therefore "NO" is determined at step S203. Then, the process proceeds to step S204 where it is determined whether the current page number i is an odd number. The current page number i is 1, and therefore "YES" is determined at step S204.

Thus, the process proceeds to step S205, when the current page number i is an odd number that does not exceed the total number of pages. At step S205, the image data of the current page (i-th page) is extracted from the print object data, and the obverse-side printing data (or first printing data) is generated based on the image data. The generated obverse-side printing data is sent to the first printer 30A via the network interface 17.

The obverse-side printing data generated at step S205 is expressed in a PDL (Page Description Language), and includes the setting information on the first printing conditions that have been set by the above first setting process. However, "Duplex Printing" option, which has been selected by the user for the first printing conditions, is invalidated in the obverse-side printing data so that single-side printing on the obverse side (or first surface) of paper can be performed by the first printer 30A.

When the current page number i is an even number that does not exceed the total number of pages, "NO" is determined at steps S203 and S204, and therefore the process proceeds to step S206. At step S206, the image data of the current page (i-th page) is extracted from the print object data, and is added into a print information file that is created on the RAM 13 as described below.

After step S205 or S206 is completed, the current page number i is incremented by 1 at step S207, and then the process returns to step S203. Thus, the steps S203 to S207 are iterated until the current page number i exceeds the total number of pages.

In this way, the image data of the odd-numbered pages (as the obverse-side printing data) is sent to the first printer 30A at step S205, sequentially and page by page. The first printer 30A receives the obverse-side printing data, and expands the image data, included in the obverse-side printing data, under control of the CPU 31.

The resultant image data is sent to the printing section 37 so that obverse-side printing is performed. At the time, the obverse-side printing is performed so as to comply with the first printing conditions included in the obverse-side printing data. Thus, the images of the odd-numbered pages are printed or outputted on the obverse side of paper.

On the other hand, the image data of the even-numbered pages are added (as print information) into the print information file at step S206, sequentially and page by page. The print information file can be created with XPS format, for example. The XPS (XML Paper Specification) is an XML-based electronic document format, which includes document fields, font fields, thumbnail fields, image fields, Print Ticket fields and the like. The Print Ticket fields include various print setting information in XML format.

Returning to FIG. 5, when the current page number i exceeds the total number of pages (i.e., "YES" is determined at step S203), the process proceeds to step S208.

If it is determined at step S208 that the total number of pages is an odd number (i.e., "YES" is determined at step S208), the CPU 11 adds blank page data (as data of i-th page where "i" is the current page number) into the print information file at step S209. For example, if the total number of pages is seven, blank page data as data of eighth page is added into the print information file so as to correspond to the fourth-page data of the print information file, as shown in FIG. 6.

If it is determined at step S208 that the total number of pages is an even number (i.e., "NO" is determined at step S208), addition of blank page data at step S209 is skipped.

In this way, blank page data is added as data of the last page when the total number of pages is an odd number. Thereby, the number of pages printed on the obverse side of paper coincides with the number of pages to be printed on the reverse side of the paper.

Consequently, any of the even-numbered pages can be printed on the reverse side of the sheet that includes the preceding odd-numbered page printed on its obverse side. Thus, the duplex printing can be achieved without resulting in incorrectly ordered pages, as described below.

Next, the CPU 11 adds the setting information (as print information) into the Print Ticket fields of the print information file at step S210. The added setting information includes at least part of the set values of options for the first printing conditions (such as "Paper Size", "Number of Copies", "Paper Orientation", "Binding Type", "Color/Monochrome", "Print Quality" and "Brightness"), which have been set by the user during the above first setting process.

The setting information added at step S210 into the print information file may include information on printing conditions other than those directly set by the user, such as information on the paper discharging mode of the first printer 30A.

When step S210 is completed, the CPU 11 terminates the obverse-side printing process (or step S101 of FIG. 4) according to the first printer driver, and subsequently starts a printer selection process (or step S102 of FIG. 4) for reverse-side printing.

(Printer Selection Process for Reverse-side Printing)

Figure 7:
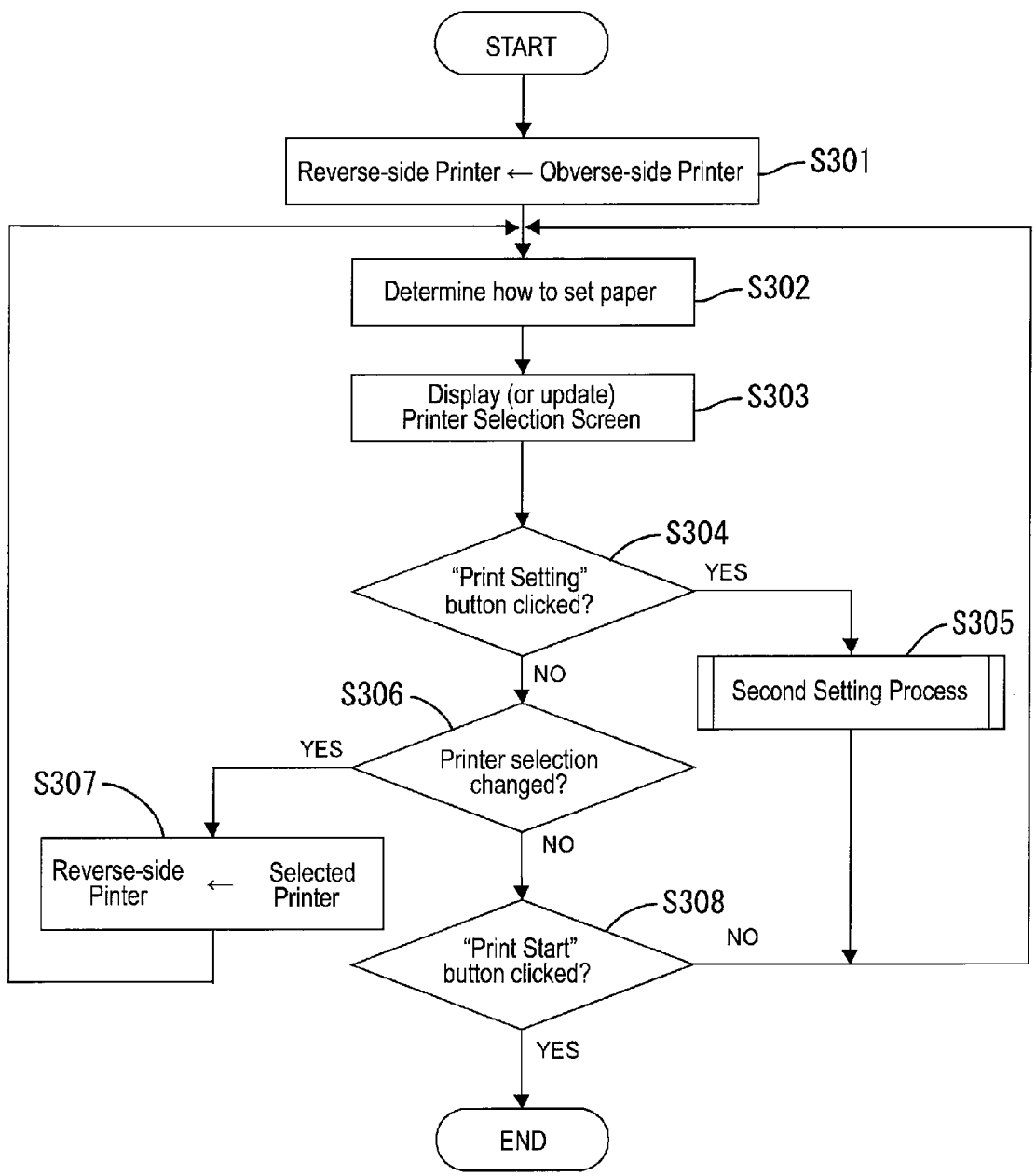
FIG. 7 is a flowchart of a printer selection process for reverse-side printing.
Figure 8:
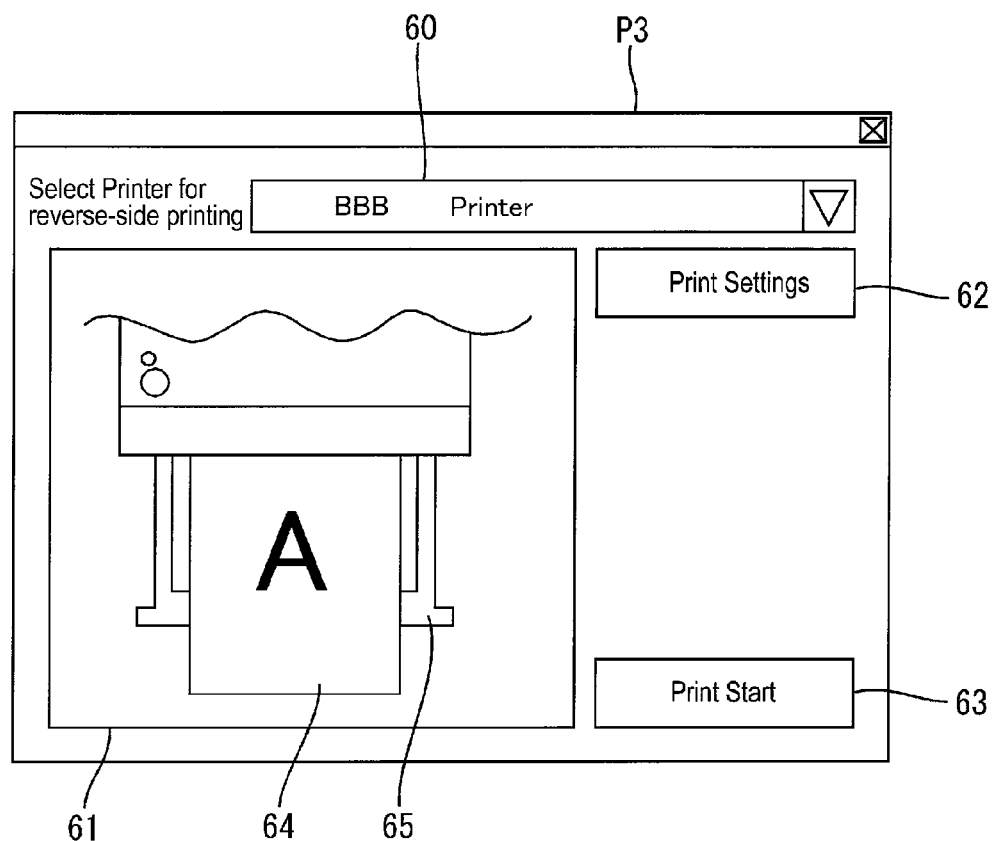
FIG. 8 is a diagram showing a reverse-side printer selection screen.
Figure 9:
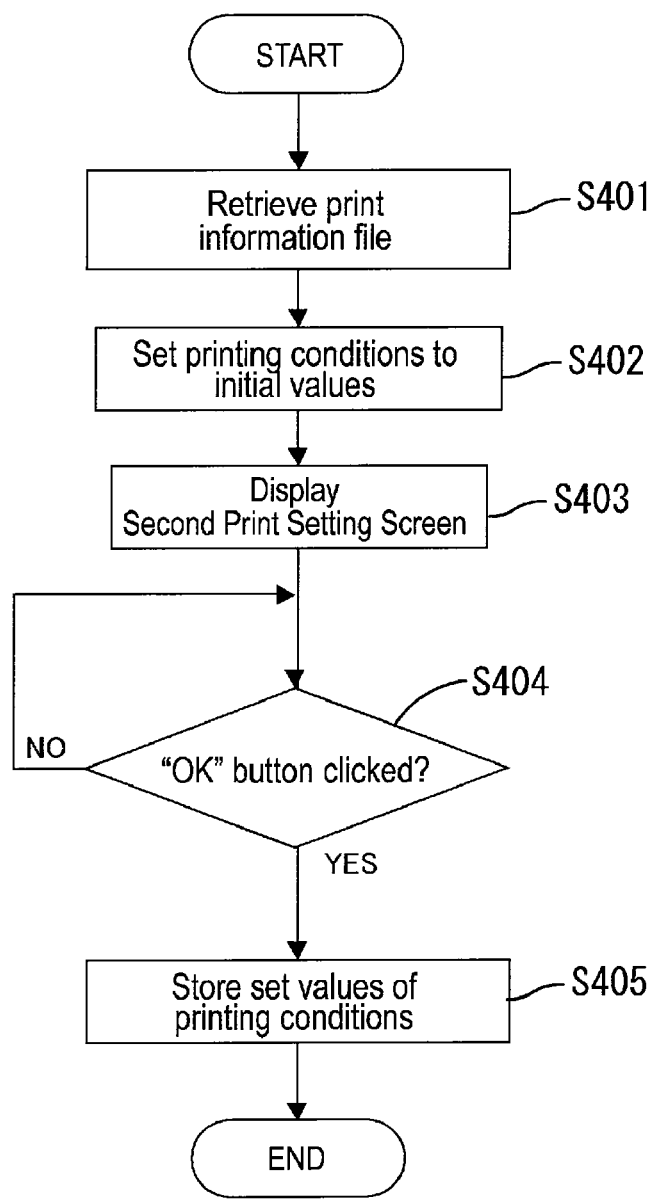
FIG. 9 is a flowchart of a second setting process.
Figure 10:
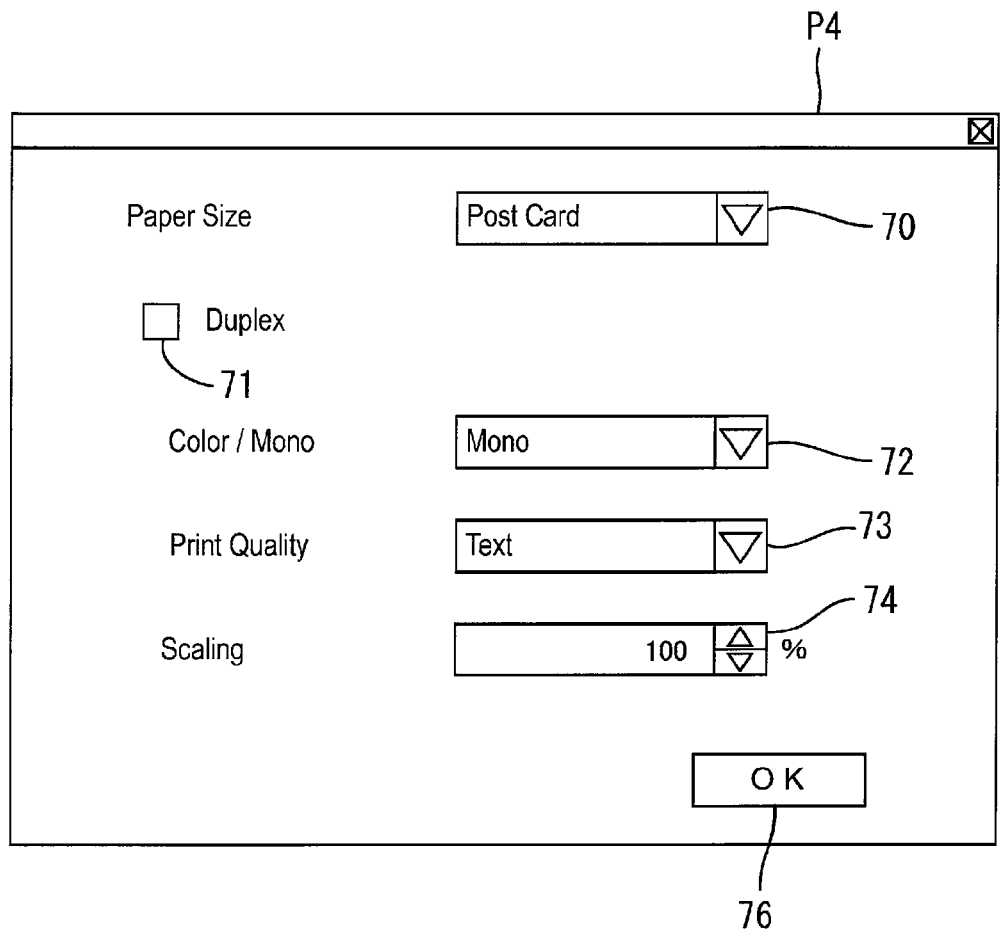
FIG. 10 is a diagram showing a second print setting screen.

FIG. 7 is a flowchart of a printer selection process for reverse-side printing. FIG. 8 is a diagram showing a reverse-side printer selection screen P3. FIG. 9 is a flowchart of a second setting process. FIG. 10 is a diagram showing a second print setting screen P4.

The CPU 11 executes a reverse-side printer selection process shown in FIG. 7 according to the first printer driver. Thereby, a reverse-side printer selection screen P3 shown in FIG. 8 is displayed on the display section 16, which enables the user to select a printer for reverse-side printing.

The reverse-side printer selection screen P3 includes a printer selection field 60, a guide section 61, "Print Settings" button 62 and "Print Start" button 63. The list of printer names corresponding to the printer drivers installed on the computer 10 can be displayed in the printer selection field 60. The user can select, from the available printers, a printer to be used for reverse-side printing.

An image, which provides pictorial instructions on how to set the obverse-side printed paper on the printer currently selected in the printer selection field 60, is displayed on the guide section 61.

Specifically, the image displayed on the guide section 61 shows the relationship between the orientation of an image printed on the obverse side and the paper feeding direction (or medium feeding direction) of the selected reverse-side printer. Further shown is whether the printed paper should be set with the printed side facing up or down.

For example, in FIG. 8, character "A" represents the image printed on the obverse side of paper 64, and the paper feeding direction corresponds to the upward direction of FIG. 8. The pictorial instructions in FIG. 8 show that the printed paper 64 should be set into the feeder tray 65 with the obverse or printed side facing up and with the top of the printed image at the first-in end of the feeder tray 65.

During the reverse-side printer selection process, referring to FIG. 7, the CPU 11 first sets (at step S301) the reverse-side printer, to be displayed as a default printer in the printer selection field 60, to the initial value that represents the printer (e.g., the first printer 30A in the present aspect) used for the obverse-side printing.

Next, how to set the printed paper on the currently selected reverse-side printer is determined at step S302, as described in detail below. In the present aspect, the first printer 30A is currently selected as the reverse-side printer, and therefore how to set the printed paper on the first printer 30A is determined at step S302.

At step S303, a reverse-side printer selection screen P3 is displayed on the display section 16. On the reverse-side printer selection screen P3, the printer name of the currently selected printer is displayed in the printer selection field 60, and further an image providing pictorial instructions on how to set the obverse-side printed paper is displayed on the guide section 61 based on the determination made at step S302.

When the user has changed the printer selected in the printer selection field 60, "YES" is determined at step S306, and thereby the process proceeds to step S307 where the reverse-side printer is set to the newly selected printer. Then, the process returns to step S302.

How to set the obverse-side printed paper on the newly selected printer is determined at step S302, and the display of the reverse-side printer selection screen P3 is updated at step S303 based on the determination made at step S302. Thereby, the name of the newly selected printer is displayed in the printer selection field 60, and an image providing pictorial instructions on how to set the obverse-side printed paper on the newly selected printer is displayed on the guide section 61.

Hereinafter, step S302 will be explained in detail. In order to determine how to set the obverse-side printed paper on the currently selected reverse-side printer, the CPU 11 obtains information on "Paper Orientation" and "Binding Type" options which were set by the above first setting process for obverse-side printing, for example.

Based on the obtained information and the current printing conditions for reverse-side printing, the CPU 11 determines how an image to be printed on the reverse side should be oriented with respect to the image printed on the obverse side.

The CPU 11 further obtains information on which side of an image is printed on the first-in side of paper by the currently selected reverse-side printer under the current printing conditions.

If the printer (e.g., the first printer 30A in the present aspect) used for obverse-side printing is currently selected as the reverse-side printer, the CPU 11 can obtain the information on which side of an image is printed on the first-in side of paper, from the printer information owned by the first printer driver itself.

If a printer other than the printer used for obverse-side printing is currently selected as the reverse-side printer, the CPU 11 inquires of the printer driver of the currently selected reverse-side printer for the printer information.

Assume that the second printer 30B is currently selected as the reverse-side printer in the present aspect. In this case, the CPU 11 inquires of the second printer driver for the printer information on the second printer 30B.

If the second printer driver supports Print Ticket, for example, the CPU 11 can obtain the printer information on the second printer 30B by requesting the second printer driver to create a Print Ticket file including the printer information. The CPU 11 can complete the acquisition of the printer information by retrieving the created Print Ticket file. Note that "Print Ticket file" corresponds to a separate file that solely includes the contents of Print Ticket fields of an XPS document described above.

As well as the orientational information on an image to be printed, the printer information from the Print Ticket file includes the information on whether the second printer 30B prints an image on the upper or lower surface of paper placed on the feeder tray, from which it can be determined whether the obverse-side printed paper should be set on the feeder tray with the obverse side facing up or down.

The CPU 11 determines, based on the obtained information, how the obverse-side printed paper should be set on the feeder tray in order that an orientationally proper image may be printed on the reverse side of the paper by the second printer 30B.

Returning to FIG. 7, if the user clicks "Print Settings" button 62 on the reverse-side printer selection screen P3, "YES" is determined at step S304 and the process proceeds to step S305. The CPU 11 activates the printer driver for the currently selected reverse-side printer at step S305.

In the present aspect, the second printer 30B is currently selected as the reverse-side printer as described above, and therefore the CPU 11 activates the second printer driver at step S305. Thereby, the CPU 11 executes a second setting process shown in FIG. 9, which enables the user to set the second printing conditions for reverse-side printing using the second printer 30B.

During the second setting process, the CPU 11 first retrieves the print information file at step S401, and obtains the setting information from the print information file (specifically, from the Print Ticket fields of the XPS print information file, in the present aspect).

Next, the setting options for the second printing conditions are set to initial values at step S402. As for at least part of the common setting options for the first and second printing conditions, the set values of the first printing conditions for the obverse-side printing are used as the initial values of the second printing conditions. As for the other setting options, predetermined values are used as the initial values of the second printing conditions.

At step S403, a second print setting screen P4 is displayed on the display section 16, as shown in FIG. 10, for example. The second print setting screen P4 includes fields enabling the user to select various setting options for the second printing conditions, such as "Paper Size" selection field 70, "Duplex Printing" selection field 71, "Color" selection field 72, "Print Quality" selection field 73 and "Scaling" setting field 74. The second print setting screen P4 further includes "OK" button 76.

As shown on the second print setting screen P4 of FIG. 10, the initial values are set to the same values as the first printing conditions, as for the common setting options displayed in "Paper Size" selection field 70, "Color" selection field 72 and "Print Quality" selection field 73.

In contrast, as for the setting options which are not provided for the first printing conditions, the initial value is set to the predetermined value, as displayed in "Scaling" setting field 74. Note that "Duplex Printing" option is unchecked (i.e., "Single-side Printing" option is selected) in "Duplex Printing" selection field 71.

The user can change the setting options for the second printing conditions, on the second print setting screen P4. However, changing "Paper Size" or selecting "Duplex Printing" option will result in unsuccessful duplex printing.

Returning to FIG. 9, when the user clicks "OK" button 76 on the second print setting screen P4, "YES" is determined at step S404 and the process proceeds to step S405 where the values specified by the user on the selection or setting fields 70 to 74 of the second print setting screen P4 are stored as the set values of the second printing conditions in the RAM 13. Then, the CPU 11 completes the second setting process (step S305 of FIG. 7), while closing the second print setting screen P4.

Referring to FIG. 7, the process returns to step S302 after the second setting process at step S305 is completed. Steps S302 and S303 are executed again based on the updated values of the second printing conditions, so that the display of the reverse-side printer selection screen P3 shown in FIG. 8 is updated.

The setting options for the second printing conditions, which can be set at step S305 by the user on the second print setting screen P4, may further include "Paper Orientation" options. In this case, the image displayed on the guide section 61 of the reverse-side printer selection screen P3 can be updated at steps S302 and S303 executed after the second setting process at step S305. Thereby, the pictorial instructions according to the newly selected "Paper Orientation" option can be provided on the guide section 61.

When the user completes the selection of the reverse-side printer on the reverse-side printer selection screen P3 and the subsequent print settings, he/she sets the obverse-side printed paper, which was ejected from the first printer 30A in the present aspect, onto the feeder tray of the selected reverse-side printer (e.g., the second printer 30B in the present aspect), according to the pictorial instructions provided on the guide section 61 of the reverse-side printer selection screen P3.

When the user clicks "Print Start" button 63, "YES" is determined at step S308 of FIG. 7, and the CPU 11 completes the reverse-side printer selection process (step S102 of FIG. 4) while closing the reverse-side printer selection screen P3 on the display section 16.

Thereafter, the CPU 11 executes a reverse-side printing process at step S103 of FIG. 4. As described above, the second printer 30B is selected as the reverse-side printer in the present aspect, and therefore the reverse-side printing process (or second printing process) is executed according to the second printer driver.

(Reverse-Side Printing Process)

Figure 11:
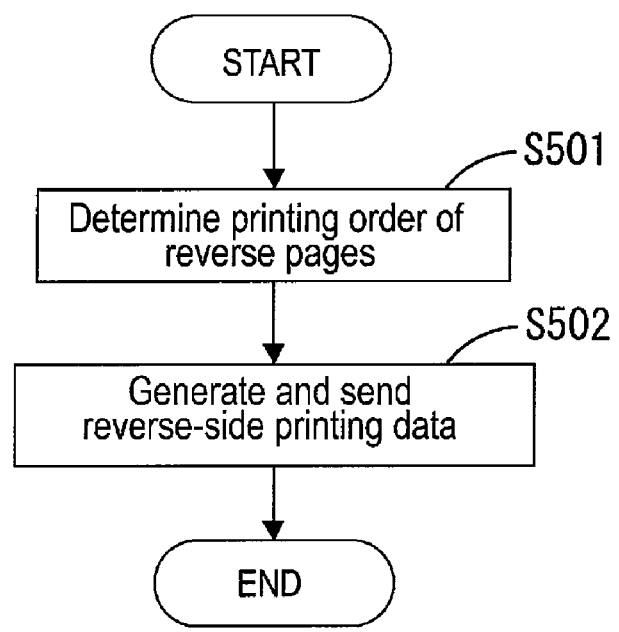
FIG. 11 is a flowchart of a reverse-side printing process.

FIG. 11 is a flowchart of a reverse-side printing process. FIG. 12 is an explanatory diagram for illustrating how to determine the printing order of the reverse pages (i.e., whether the reverse pages should be printed in the ascending or descending order).

During the reverse-side printing process, the CPU 11 first determines at step S501 whether the reverse (or even-numbered) pages should be printed on the revere side of the obverse-side printed paper in the ascending order (such as Page 2, Page 4 and Page 6) or in the descending order (such as Page 6, Page 4 and Page 2).

In the present aspect, the printers capable of being used for the obverse-side printing include a face-up discharging printer and a face-down discharging printer. A face-up discharging printer prints a plurality of odd-numbered pages in the ascending order and ejects the printed sheets with the printed sides facing up, so that the printed sheets are stacked with the first page (Page 1) at the bottom of the stack and facing up. A face-down discharging printer prints a plurality of odd-numbered pages in the ascending order and ejects the printed sheets with the printed sides facing down, so that the printed sheets are stacked with the first page (Page 1) at the bottom of the stack and facing down.

The first printer 30A, which was used for the obverse-side printing in the present aspect, can be a face-up discharging type or a face-down discharging type. The information on whether the first printer 30A is a face-up or face-down discharging type can be obtained from the above print information file.

Further, in the present aspect, the printers capable of being used for the reverse-side printing include four types of printers. A first type printer feeds the top sheet from the stack of sheets on the feeder tray, and prints an image on the upper surface of the sheet. A second type printer feeds the bottom sheet from the stack of sheets on the feeder tray, and prints an image on the upper surface of the sheet. A third type printer feeds the top sheet from the stack of sheets on the feeder tray, and prints an image on the lower surface of the sheet. A fourth type printer feeds the bottom sheet from the stack of sheets on the feeder tray, and prints an image on the lower surface of the sheet.

The second printer 30B, which is used for the reverse-side printing in the present aspect, can be one of the four types. The information on the type of the second printer 30B can be obtained from the printer information owned by the second printer driver itself.

The user will place the stack of sheets, which was ejected from the first printer 30A, onto the feeder tray of the second printer 30B according to the pictorial instructions provided on the guide section 61 of the reverse-side printer selection screen P3, as described above. If the first printer 30A is a face-up discharging type and the second printer 30B is a first type, for example, the user will place the stack of the ejected sheets onto the feeder tray of the second printer 30B, with the printed sides facing down and without sorting.

In this case, referring to FIG. 12, the CPU 11 determines, at step S501 of FIG. 11, that the even-numbered pages should be printed in the ascending order on the reverse-sides of the obverse-side printed sheets. Thereby, any of the even-numbered pages can be printed on the reverse side of the sheet that includes the preceding odd-numbered page printed on its obverse side.

As for the other combinations of the face-up or faced-down discharging type and the first-to-fourth types, the determination at step S501 can be made similarly, as shown in the table of FIG. 12.

The first print setting screen P2 may include fields for enabling the user to select the ascending or descending order for the obverse-side printing. In this case, at step S501, the CPU 11 can obtain, from the print information file, the information on whether the obverse pages were printed in the ascending or descending order, and determine based on the obtained information whether the reverse pages should be printed in the ascending or descending order.

Next, the CPU 11 generates the reverse-side printing data (or second printing data) based on the print information file at step S502. The reverse-side printing data is expressed in a PDL (e.g., in XPS format), and includes the setting information on the second printing conditions, which have been set during the above second setting process. The reverse-side printing data further includes image data of the even-numbered pages that can be obtained from the print information file.

If the ascending order is determined at step S501, the CPU 11 arranges the image data of the even-numbered pages included in the reverse-side printing data, in the ascending order. If the descending order is determined at step S501, the CPU 11 arranges the image data of the even-numbered pages included in the reverse-side printing data, in the descending order.

The reverse-side printing data thus generated is sent to the second printer 30B. Then, the CPU 11 terminates the reverse-side printing process (step S103 of FIG. 4), and thereby the present duplex printing process is completed.

The second printer 30B receives the reverse-side printing data, and expands the image data, included in the reverse-side printing data, under control of the CPU 31. The resultant data is sent to the printing section 37, so that reverse-side printing is performed. At the time, the reverse-side printing is performed so as to comply with the second printing conditions included in the reverse-side printing data. Thus, the images of the even-numbered pages are printed or outputted on the reverse side (or second surface) of the obverse-side printed paper.

3. Effects of the Present Aspect

According to the present aspect, as described above, the first printer driver, provided to generate first printing data (e.g., the obverse-side printing data) used by the first printer 30A for printing on the first surface (e.g., the obverse side) of a recording medium, generates print information. The second printer driver generates, based on the print information, the second printing data (e.g., the reverse-side printing data) used by the second printer 30B for printing on the second surface (e.g., the reverse side) of the recording medium.

Thus, the printing on the first surface and the printing on the second surface can be performed by using different printer drivers. Further, the print information can be transferred from the first printer driver to the second printer driver, and thereby some advantages such as facilitation of printing condition settings can be provided so as to improve convenience of duplex printing for a user.

The first printer driver extracts, from the original print object data, the image data to be used for printing on the second surface, so that the second printer driver can perform second-surface printing based on the extracted image data. According to the construction, the second printer driver can achieve the second-surface printing, even if the second printer driver does not have a function for sorting out the image data for the second surface from the original print object data, for example.

Further, according to the present aspect, the setting information on the first printing conditions is transferred to the second printer driver, so that the set values of the first printing conditions are used as the initial values of the second printing conditions as for at least part of the common setting options for the first and second printing conditions. Thereby, the setting operation for the second printing conditions for the second-surface printing can be facilitated.

Further, how to set the printed paper on the second printer 30B is determined based on the orientational relationship between an image printed on the obverse side by the first printer 30A and an image to be printed on the reverse side by the second printer 30B, and the instructions are provided on the guide section 61. Thereby, a user can be prevented from setting the printed paper in an inappropriate orientation for second-surface printing.

The printing order of the reverse pages is determined depending on whether the first printer 30A is a face-up discharging type or a face-down discharging type, and the second printing data is generated based on the determined printing order. Thereby, any of the even-numbered pages can be printed on the reverse side of the recording medium that includes the preceding odd-numbered page printed on its obverse side. That is, the duplex printing can be achieved without resulting in incorrectly ordered pages.

If the total number of pages is an odd number (i.e., the number of odd-numbered pages are larger than the number of even-numbered pages), a blank page as the last page is added into the print information file so that the number of even-numbered pages coincides with the number of odd-numbered pages. Thereby, any of the even-numbered pages can be printed on the reverse side of the recording medium that includes the preceding odd-numbered page printed on its obverse side. That is, the duplex printing can be achieved without resulting in incorrectly ordered pages.

<Other Illustrative Aspects>

The present invention is not limited to the aspect explained in the above description made with reference to the drawings. The following aspects may be included in the technical scope of the present invention, for example.

(1) In the above aspect, the configurations of various screens and the setting options for the printing conditions are shown for illustrative purposes. They can be varied in various ways.

(2) In the above aspect, the print information, which can be transferred from the first printer driver to the second printer driver, includes the setting information and the image data. However, the format and contents of the print information can be varied in various ways.

For example, the print information, transferred from the first printer driver to the second printer driver, may solely include the setting information. In this case, the second printer driver can receive the image data from the application software program being executed.

Alternatively, the image data may be solely transferred as the print information from the first printer driver to the second printer driver, without the setting information being transferred.

(3) In the above aspect, how to set the printed paper on the second printer 30B is determined by the first printer driver. However, instead of the first printer driver, the second printer driver may determine how to set the printed paper, and provide the instructions to the user.

In this case, the second printer driver can determine how to set the printed paper, based on the setting information included in the print information file transferred from the first printer driver and further based on the printer information on the second printer 30B owned by the second printer driver itself.

Further, in this case, the instructions on how to set the printed paper on the second printer 30B can be displayed, for example, on the second print setting screen P4 by the second printer driver when the user clicks "Print Settings" button 62 on the reverse-side printer selection screen P3, instead of the instructions being displayed on the guide section 61 of the reverse-side printer selection screen P3.

(4) Further, in the case that the second printer 30B includes a plurality of feeder trays, the information on which feeder tray should be used for loading the printed paper may be additionally provided for the user when the instructions on how to set the printed paper is displayed by the second printer driver.

What is claimed is:

1. A printing system comprising:
  a first printing apparatus;
  a second printing apparatus; and
  an information processing apparatus capable of being connected to said first printing apparatus and said second printing apparatus, said information processing apparatus including a control portion configured to execute a duplex printing process to enable printing on a first surface and a second surface of a recording medium in response to a request for duplex printing of print object data, wherein:
    said control portion executes a first printing process according to a first printer driver, during said duplex printing process, to generate, based on said print object data, first printing data to be used by said first printing apparatus for printing on said first surface and print information to be used for printing on said second surface;
    said control portion executes a second printing process according to a second printer driver, during said duplex printing process, to generate, based on said print information, second printing data to be used by said second printing apparatus for printing on said second surface;
    in a case that said print object data includes image data to be printed on a plurality of recording media, said control portion executes a process according to one of said first printer driver and said second printer driver, during said duplex printing process, to determine, based on an order of a plurality of pages printed on first surfaces of the plurality of stacked recording media ejected from said first printing apparatus, a printing order of a plurality of pages to be printed on second surfaces of the plurality of recording media by said second printing apparatus; and
    said second printing data is generated based on said determined printing order during said second printing process.

2. A printing system as in claim 1, wherein:
  the first printing process to generate said first printing data and said print information includes image data of an image to be printed on said second surface being extracted from said print object data, so that said print information is generated to include said extracted image data; and
  the second printing process to generate said second printing data includes said second printing data being generated based on said image data during said second printing process.

3. A printing system as in claim 1, wherein:
  said control portion executes a first setting process according to said first printer driver, during said duplex printing process, to set a first printing condition for printing on said first surface, so that said first printing data and said print information are generated during said first printing process to both include setting information on said first printing condition;
  said control portion executes a second setting process according to said second printer driver, during said duplex printing process, to set a second printing condition for printing on said second surface, so that said second printing data is generated during said second printing process to include setting information on said second printing condition; and
  said second printing condition is set based on said print information, so that a set value of said first printing condition is used as an initial value of said second printing condition during said second setting process, as for at least part of common setting options for said first and second printing conditions.

4. A printing system as in claim 1, further comprising:
  a guide portion configured to show how to set the recording medium on said second printing apparatus;
  wherein said control portion executes a process according to one of said first printer driver and said second printer driver, during said duplex printing process, to determine, based on an orientational relationship between an image printed on said first surface by said first printing apparatus and an image to be printed on said second surface by said second printing apparatus, how to set the recording medium on said second printing apparatus, which is to be shown by said guide portion.

5. A printing method for use in a printing system that includes a first printing apparatus, a second printing apparatus and an information processing apparatus capable of being connected to said first printing apparatus and said second printing apparatus, said information processing apparatus including a control portion configured to execute a duplex printing process to enable printing on a first surface and a second surface of a recording medium in response to a request for duplex printing of print object data, said printing method comprising:
  executing a first printing process according to a first printer driver during said duplex printing process, to generate, based on said print object data, first printing data to be used by said first printing apparatus for printing on said first surface and print information to be used for printing on said second surface; and
  executing a second printing process according to a second printer driver during said duplex printing process, to generate, based on said print information, second printing data to be used by said second printing apparatus for printing on said second surface; and
  executing a process according to one of said first printer driver and said second printer driver during said duplex printing process if said print object data includes image data to be printed on a plurality of recording media, to determine, based on an order of a plurality of pages printed on first surfaces of the plurality of stacked recording media ejected from said first printing apparatus, a printing order of a plurality of pages to be printed on second surfaces of the plurality of recording media by said second printing apparatus, wherein said second printing data is generated based on said determined printing order during said second printing process.

6. A printing method as in claim 5, wherein:

executing the first printing process to generate said first printing data and said print information includes image data of an image to be printed on said second surface being extracted from said print object data, so that said print information is generated to include said extracted image data; and executing the second printing process to generate said second printing data includes said second printing data being generated based on said image data.

7. A printing method as in claim 5, further comprising:

executing a first setting process according to said first printer driver during said duplex printing process, to set a first printing condition for printing on said first surface, so that said first printing data and said print information are generated during said first printing process to both include setting information on said first printing condition; and executing a second setting process according to said second printer driver during said duplex printing process, to set a second printing condition for printing on said second surface, so that said second printing data is generated during said second printing process to include setting information on said second printing condition;

wherein said second printing condition is set based on said print information, so that a set value of said first printing condition is used as an initial value of said second printing condition during said second setting process, as for at least part of common setting options for said first and second printing conditions.

8. A printing method as in claim 5, further comprising:

executing a process according to one of said first printer driver and said second printer driver during said duplex printing process, to determine, based on an orientational relationship between an image printed on said first surface by said first printing apparatus and an image to be printed on said second surface by said second printing apparatus, how to set the recording medium on said second printing apparatus; and displaying how to set the recording medium on said second printing apparatus.

9. A printer driver system comprising:

an information processing apparatus capable of being connected to a first printing apparatus and a second printing apparatus, said information processing apparatus being configured to generate first printing data and print information in response to a request for duplex printing of print object data, wherein:

said first printing data is generated based on said print object data, so as to be used by said first printing apparatus for printing on a first surface of a recording medium; and said print information is generated based on said print object data, so as to be capable of being used by a second printer driver system for generating second printing data to be used by said second printer apparatus for printing on a second surface of said recording medium;

in a case that said print object data includes image data to be printed on a plurality of recording media, during duplex printing and based on an order of a plurality of pages printed on first surfaces of the plurality of stacked recording media ejected from said first printing apparatus, a printing order of a plurality of pages to be printed on second surfaces of the plurality of recording media by said second printing apparatus is determined; and said second printing data is generated based on said determined printing order.

10. A printer driver system as in claim 9, wherein said information processing apparatus extracts image data of an image to be printed on said second surface from said print object data, so that said print information is generated to include said extracted image data.

11. A printer driver system as in claim 9, wherein said information processing apparatus sets a first printing condition for printing on said first surface, so that said first printing data and said print information are generated to both include setting information on said first printing condition.

12. A non-transitory computer readable medium including a printer driver program embodied thereon and operable to implement a printer driving method in a printing system that includes a first printing apparatus, a second printing apparatus and an information processing apparatus capable of being connected to said first printing apparatus and said second printing apparatus, said information processing apparatus including a control portion capable of executing said printer driver program for implementing said printer driving method, said printer driver program comprising:

code for generating first printing data and print information in response to a request for duplex printing of print object data, wherein:

said first printing data is generated based on said print object data, so as to be used by said first printing apparatus for printing on a first surface of a recording medium;

said print information is generated based on said print object data, so as to be capable of being used by a second printer driver program executed for generating second printing data to be used by said second printer apparatus for printing on a second surface of said recording medium;

in a case that said print object data includes image data to be printed on a plurality of recording media, during said duplex printing and based on an order of a plurality of pages printed on first surfaces of the plurality of stacked recording media ejected from said first printing apparatus, a printing order of a plurality of pages to be printed on second surfaces of the plurality of recording media by said second printing apparatus is determined; and said second printing data is generated based on said determined printing order.

13. A non-transitory computer readable medium as in claim 12, wherein the code for generating said first printing data and said print information includes code for extracting image data of an image to be printed on said second surface from said print object data, so that said print information is generated to include said extracted image data.

14. A non-transitory computer readable medium as in claim 12, wherein said printer driver program further comprises code for setting a first printing condition for printing on said first surface, so that said first printing data and said print information are generated to both include setting information on said first printing condition.

* * * * *